3,134,813
PURIFICATION OF TOLYLENEDIAMINE
Ralph L. Pelley, Linthicum Heights, Md., assignor to FMC Corporation, New York, N.Y., a corporation of Delaware
No Drawing. Filed Nov. 14, 1962, Ser. No. 237,708
8 Claims. (Cl. 260—582)

This invention relates to a novel process for obtaining pure meta-tolylenediamines, and more particularly it relates to a process of separating meta-tolylenediamines from ortho-tolylenediamines.

Meta-tolylenediamine, as produced by the catalytic hydrogenation of commercial-grade dinitrotoluene, contains the ortho-diamino isomers, 2,3- and 3,4-tolylenediamine, in small quantities. These ortho, or vicinal, diamines are undesirable in the preparation of diisocyanates for urethane resins in which process the meta-diamines are important reactants. During the process of converting the diamines to diisocyanates, these unwanted isomers form tarry residues that can interact with the meta-diamines and diisocyanates resulting in loss of desirable reactants, with resultant reduced yields. Although the vicinal isomers account for not much more than 4% of the hydrogenation product, they nonetheless can cause considerable processing difficulties. A diamine mixture almost entirely free of vicinal isomers is therefore highly desirable.

No satisfactory way has been discovered to separate the vicinal isomers from the commercial dinitro mixture, and until now, the purification of the diamine mixture has been similarly difficult to achieve. The diamino isomers so resemble each other chemically, that no reagent has previously been discovered to effect selective reactions.

My object in this invention, therefore, is to provide a method for purifying crude tolylenediamine to produce a meta-tolylenediamine mixture substantially free of vicinal isomeric compounds. This and other objects will become evident from my disclosure.

I have now discovered that a substantially pure mixture of meta-isomers of tolylenediamine can be obtained by treating a crude mixture of meta and ortho isomers of tolylenediamine with carbon bisulfide, thereby causing the ortho isomers to react with the carbon bisulfide and evolving hydrogen sulfide gas. When no further evolution occurs, the meta-tolylenediamines may be separated from the reaction mass by distillation.

Crude tolylenediamine, as obtained from the hydrogenation of ordinary commercial dinitrotoluene, contains from about 74 to 77% of 2,4-tolylenediamine, 20 to 21% of the 2,6-, 1.7 to 2.8% of the 3,4- and 0.8 to 1.3% of the 2,3-isomer. This mixture may be dissolved in a solvent to form a solution containing preferably 10 to 70% of the diamines by weight of solution. The solvent should of course be inert under reaction conditions. Of the suitable solvents, water is the most convenient to use since it is the prefered medium in the hydrogenation reaction. Inert, organic solvents can also be employed; or the diamine mixture may be heated to its melt temperature and no solvent need be added at all. The only preferred limitation is that the crude mixture be in a liquid state prior to adding the carbon bisulfide.

Carbon bisulfide is added to the liquid mixture at a temperature in the range of 25 to 75° C. Hydrogen sulfide gas soon begins to evolve, and the gas is continually vented throughout the entire reaction. The reaction may take from several minutes to about two hours in duration, depending upon which type of solvent system is employed. The end point is reached when no further evolution of hydrogen sulfide is detected.

Surprisingly, only the vicinal isomers will react readily with carbon bisulfide to produce substances which cannot be distilled with the meta-diamines. The meta-diamines, not having reacted, are easily separated by distillation from the cyclic sulfur derivatives produced from the vicinal isomers. I believe the reaction proceeds as follows:

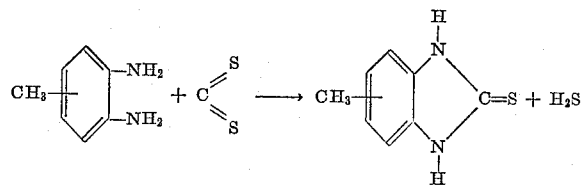

If the reaction is run in a solvent in which all reactants are miscible, the reaction time will naturally be short because of the intimate contact obtained. On the other hand, if the solvent is immiscible with carbon bisulfide, the reaction may take a longer time. However, in such a case, a phase separation will occur; the unreacted meta-diamines will be predominantly in the aqueous phase, while the cyclic derivative will be in the heavy organic or oil phase. This natural separation obviously simplifies the final separation of the amines.

The reaction may be operated without the use of a solvent, as mentioned above, by melting the crude diamine mixture and treating the molten mass with carbon bisulfide. The reaction rate under such conditions is faster than in the above two methods.

Because of the readiness with which the vicinal isomers react with carbon bisulfide, I prefer to operate this process at moderate temperatures, preferably in the range of 25° to 75° C. at atmospheric pressure. Higher temperatures and pressures may be used, but they are not economically desirable.

A stoichiometric amount of carbon bisulfide based on the vicinal amines is required, although considerably more carbon bisulfide can be added if desired. I prefer to add at least a slight excess owing to possible vapor loss of the bisulfide during the venting of hydrogen sulfide.

For the solvent, as mentioned earlier, water or an inert organic solvent, such as monochlorobenzene or dichlorobenzene, may be used; or no solvent at all if the reaction is run at the melt temperature of the diamine mixture, which may range from 60° to 75° C.

After the reaction is complete any standard method of distillation may be used to separate the essentially pure meta-diamine mixture from the reaction mass.

The following examples will illustrate the manner of performing my invention but they should not be looked upon as limiting thereto.

*Example I*

Thirty parts by weight (0.246 mole) of a mixture of tolylenediamine containing 4% of 2,3- and 3,4-tolylenediamine (1.2 parts, 0.0098 mole) was dissolved in 200 parts of water. To the solution was added 1.3 parts (0.016 mole) of carbon bisulfide and the mixture was stirred for 1 and ½ hours at 50° C. Hydrogen sulfide gas was allowed to vent freely. At the completion of the gas evolution, a two-phase liquid mass remained in the reaction vessel: an aqueous phase and an oil phase. The heavier oil phase was removed and washed with quantities of hot water. The wash water was separated from the oil and combined with the aqueous phase. The water of this combined solution was distilled off leaving 26.8 parts (93% yield) of meta-tolylenediamine containing essentially no 2,3- or 3,4-tolylenediamines.

*Example II*

The method of Example I was repeated with 200 grams of a 63% aqueous solution of crude tolylenediamine containing 2.5% (0.0258 mole) vicinal diamines by weight.

This mixture was treated with 7.2 grams (0.0947 mole) of carbon bisulfide. After 1 and ½ hours of reaction at about 35° C. the reaction mass was treated as above, leaving 104.5 grams (85% yield) of pure meta-tolylenediamine.

*Example III*

One hundred parts of a crude mixture of tolylenediamine containing 3% (0.0246 mole) vicinal diamines was heated to about 70° C. which was the melt temperature of the mixture. To the molten mass was added 7 parts (0.092 mole) of carbon bisulfide and the reaction was continued for 40 minutes. After removal of the excess carbon bisulfide, the residue was found to be principally meta-tolylenediamine which contained about 0.15% of vicinal tolylenediamines.

*Example IV*

Four hundred grams of distilled tolylenediamine containing 2.5% (0.082 mole) vicinal isomers were dissolved in 1200 grams of monochlorobenzene. The solution was treated with 7.2 grams (0.0947 mole) of carbon bisulfide by stirring it for an hour at 50° to 70° C. The solvent was stripped off and the tolylenediamine was distilled at 120° C. at 5 mm. Hg, yielding 351 grams (90% yield) of meta-tolylenediamine. The distillate contained 0.1% vicinal isomer.

*Example V*

Using the method of Example I, 450 pounds of a 90% crude mixture of tolylenediamine, containing 2.3% (0.0765 mole) vicinal isomers, were dissolved in 2850 pounds of water. To this solution was added 26 pounds (0.343 mole) of carbon bisulfide and hydrogen sulfide gas was vented off at 50° C. under stirring for two hours. The method of separation as discussed in Example I was employed yielding 285 pounds (72% yield) of meta-tolylenediamine, free of vicinal impurities.

Having described my invention, I claim:

1. A process for the purification of meta-tolylenediamine comprising adding to a crude mixture of meta- and ortho-tolylenediamines at least one mole of carbon bisulfide per mole of ortho-tolylenediamine, reacting the ortho-tolylenediamine with the carbon bisulfide, and separating the meta-tolylenediamine from the reaction mass.

2. A process for the purification of meta-tolylenediamine comprising adding to a crude mixture of meta- and ortho-tolylenediamine in a liquid state from 1 to 4 moles of carbon bisulfide per mole of ortho-tolylenediamine, reacting the ortho-tolylenediamine with the carbon bisulfide, and separating the meta-tolylenediamine from the reaction mass.

3. The process of claim 2, wherein the reaction mass is maintained at a temperature of 25° to 75° C.

4. A process for the purification of meta-tolylenediamine comprising the steps of
   (a) dissolving a crude mixture of meta- and ortho-tolylenediamine in water to form a 10% to 70% solution,
   (b) adding from 1 to 4 moles of carbon bisulfide per mole of ortho-tolylenediamine, thereby causing the carbon bisulfide to react with the ortho-tolylenediamine and allowing hydrogen sulfide gas to evolve,
   (c) separating the water mixture from an oil phase formed in the said reaction, and
   (d) separating the meta-tolylenediamine from the water by distillation.

5. The process of claim 4 wherein the reaction between carbon bisulfide and ortho-tolylenediamine is operated at 25° to 50° C.

6. A process for the purification of meta-tolylenediamine comprising the steps of
   (a) dissolving a crude mixture of meta- and ortho-tolylenediamines in an inert organic solvent to form a 10% to 70% solution,
   (b) adding from 1 to 4 moles of carbon bisulfide per mole of ortho-tolylenediamine, thereby causing the carbon bisulfide to react with the ortho-tolylenediamine and allowing hydrogen sulfide gas to evolve, and
   (c) separating meta-tolylenediamine from the reaction mass by distillation.

7. A process for the purification of meta-tolylenediamine comprising the steps of
   (a) melting a crude mixture of meta- and ortho-tolylenediamine,
   (b) adding to said molten mixture from 1 to 4 moles of carbon bisulfide per mole of ortho-tolylenediamine, thereby causing the carbon bisulfide to react with the ortho-tolylenediamine and allowing hydrogen sulfide gas to evolve, and
   (c) separating meta-tolylenediamine from the reaction mass by distillation.

8. The process of claim 7 wherein the reaction is maintained at 60° to 75° C.

No references cited.